Jan. 11, 1966 W. G. BROWN 3,228,384
VALVE STEM SEALING MEANS WITH POSITIVE STEM LUBRICATION
Filed Dec. 7, 1964 2 Sheets-Sheet 1

INVENTOR
WILLIAM G. BROWN
BY
ATTORNEY

Jan. 11, 1966       W. G. BROWN       3,228,384
VALVE STEM SEALING MEANS WITH POSITIVE STEM LUBRICATION
Filed Dec. 7, 1964                    2 Sheets-Sheet 2
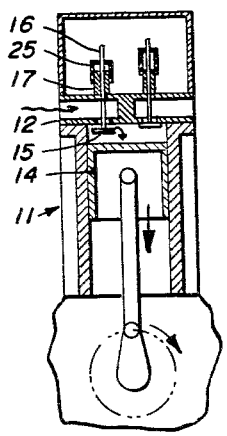
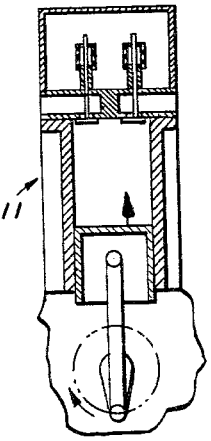
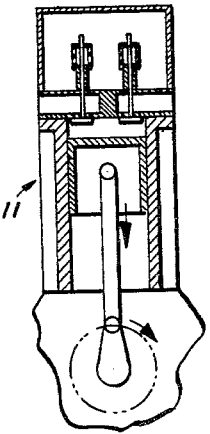
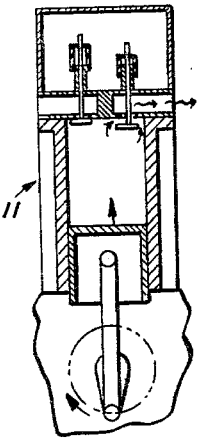
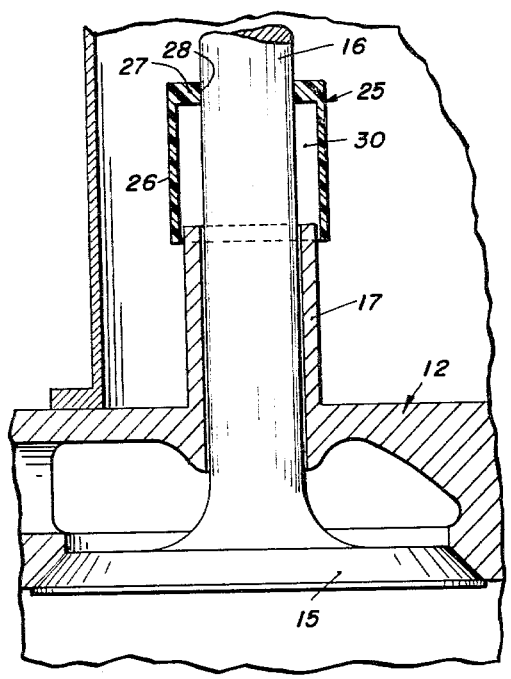
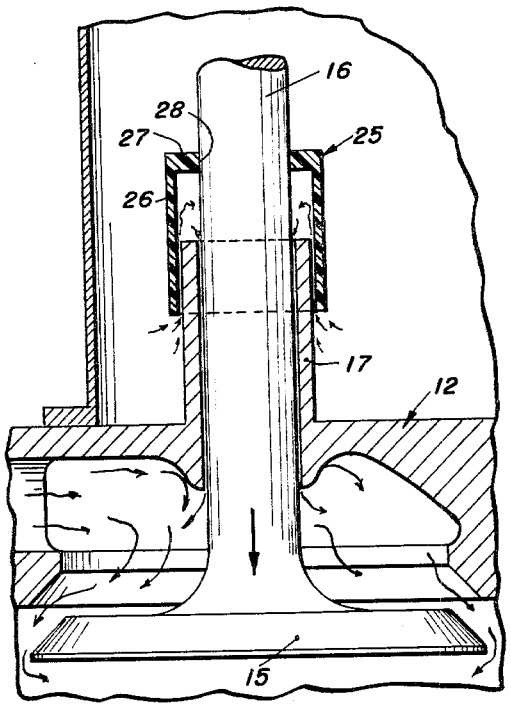
INVENTOR
WILLIAM G. BROWN
BY
ATTORNEY United States Patent Office 3,228,384
Patented Jan. 11, 1966

1

3,228,384
VALVE STEM SEALING MEANS WITH POSITIVE
STEM LUBRICATION
William G. Brown, 108 W. Florence Ave.,
Inglewood, Calif.
Filed Dec. 7, 1964, Ser. No. 416,477
4 Claims. (Cl. 123—188)

This invention relates to means for sealing valve stems in internal combustion engines which means also provides positive action to adequately lubricate the valve stems.

In internal combustion engines, the intake and exhaust valves are cam operated through rocker arms in the case of an overhead valve engine, or through plungers in the case of an L-head engine. Each valve comprises a valve head, and a stem reciprocably mounted in a guide, with the end of the stem engaged by the rocker arm or plunger, as the case may be. The guide may be an integral part of the cylinder head or cylinder block, or may comprise a separate member fitted in the cylinder head or cylinder block. In the case of the overhead valve engine, oil is usually supplied through the rocker arm to the point of contact with the end of the valve stem, and the oil runs down along the valve stem to lubricate the guide. As wear occurs in the guide or on the stem, the oil tends to work through the guide to the head of the valve where it may be drawn into the combustion chamber portion of the cylinder and head in the case of an intake valve, or where the oil will be contacted by the hot exhaust gases in the case of an exhaust valve. In either instance, the oil will be burned, causing smoke in the exhaust, as well as a waste of oil. Similar conditions will occur in the case of an L-head engine.

One object of the invention is to provide a rigid cup-like seal for a valve stem. Another object is to provide a rigid cup-like means for sealing a valve stem which prevents excessive oil movement between the stem and the stem guide while at the same time providing positive means for lubrication of the valve stem in the guide bore.

A further object is to provide a rigid cup-like seal means attached to and moving with a valve stem which provides an adequate amount of oil to lubricate the valve stem and the bore of the valve stem guide.

These and other objects are attained by my invention which will be understood from the following description, reference being made to the accompanying drawings, in which:

FIGS. 4 to 7 are schematic drawings showing the relative positions of the piston in the cylinder and the intake and exhaust valves of an internal combustion engine;

FIG. 8 is an enlarged schematic drawing showing the relative positions of the engine valve and the valve stem guide, valve stem and seal at the closed position of the engine valve; and FIG. 9 is an enlarged schematic drawing showing the relative positions of the parts as in FIG. 8, but at the open position of the engine valve.

2

Figure 1:
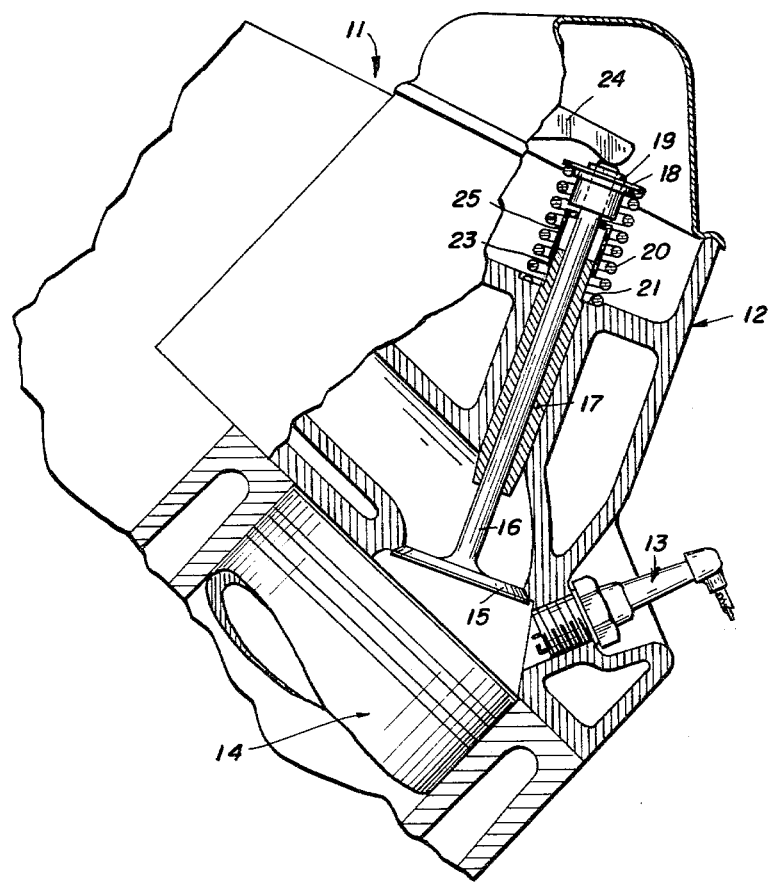
FIG. 1 is a fragmentary side elevational view of the head of an internal combustion engine, with parts broken away and shown in section, showing a valve head and stem, a valve stem guide, a lubricating valve stem seal and associated conventional parts of an overhead valve engine.

Referring to the drawings, particularly FIG. 1, an internal combustion engine shown as a fragmentary portion 11 has a cylinder head 12, a spark plug 13, piston 14, valve head 15, valve stem 16 and valve stem guide 17. The valve stem 16 extends above the guide 17 and is provided with an end collar 18 which is attached to the end of the valve stem by a split wedge key 19, the valve spring 20 being compressed between the collar 18 and the surface 21 adjacent the protruding cylindrical end 23 of the valve stem guide 17.

A rocker arm 24 presses at times upon the upper end of the valve stem 16 to press the valve head 15 open against the pressure of spring 20.

Figure 2:
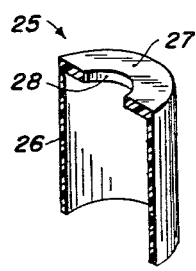
FIG. 2 is a perspective view partly in section of a unitary rigid oil seal and stem lubricating means of this invention.

The preferred cup-like member 25, shown in FIG. 2, consists of a unitary molded plastic cylindrical body having relatively thin walls 26, the inside being cylindrical and sized to slidingly fit the protruding end 23 of the valve stem guide 17 (or guide valve boss in the case of integral guides). The member 25 has an end closure 27 which is provided with an axial aperture 28 which makes an interference fit or pressed fit on the valve stem 16. The member 25 in its preferred form is made of a rigid inert non-metallic low friction material and is preferably molded Teflon, a fluoroethylene polymer resin made by E. I. du Pont de Nemours & Co. Other molded resins having similar properties may also be used.

Figure 3:
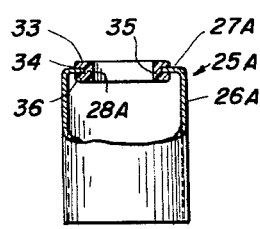
FIG. 3 is a side elevational view partly in section showing an alternative rigid oil seal and stem lubricating means.

The alternative, less expensive, form of the cup-like member 25A shown in FIG. 3, is fabricated from a precision-made drawn steel cup 26A with thin walls turned in at the upper end to form the closure 27A of the cup, which has an axial hole 28A somewhat larger than the valve stem. In the hole 28A there is provided a grommet 33 of an oil and temperature-resistant pliable material, for example Neoprene rubber, which is provided with a peripheral slot 34 which engages the edges of closure 27A. The grommet 33 has an axial hole 35 which makes a slight interference fit on the valve stem 16. The outside edges 36 of the grommet which engage the edges of the hole 35 overlap sufficiently to prevent the grommet from becoming separated during operation. The cup 26A may be made of any suitable metal, including beryllium copper alloys which do not become brittle or work-hardened as do some steel alloys. When the grommet is made of Neoprene rubber or similar pliable, semi-rigid material, it has the advantage of absorbing high-frequency vibrations which are known to be present in high speed reciprocative engines, and the danger of development of fatigue cracks in the metal cup is avoided.

The cup-like member 25 is fixedly positioned on the valve stem 17 so that its open cylindrical end, i.e. its skirt or side wall 26, is in sliding contact with the protruding cylindrical end 23 of the valve stem guide 17. The cup-like member 25 moves with the valve stem. In practice the protruding end 23 of the valve stem guide 17 (or the guide valve boss in the case of integral guides) is machined to an accurate diameter to fit the pre-formed cup-like member 25. The cup-like member 25 cannot become dislodged from its normal operating position because it is held to the valve stem by the interference or pressed fit between the stem 16 and the aperture 28 in the closed end 27. The alternative form 25A functions in a similar manner.

The usual forms of valve stem seals, which surround the valve stem but do not reciprocate with it, remove substantially all of the oil and keep it away from the cylinder head, but do not leave a sufficient amount of oil to give lubrication of the valve stem in the bore of the guide. This problem is solved by my invention.

The cup-like member 25 of this invention prevents large amounts of lubricating oil from being drawn past the guide and into the cylinder, but at the same time positively insures that a small quantity of oil, sufficient for lubricating purposes, will reach the valve stem and guide, especially when the valve is just starting to open, when lubrication is most beneficial.

The amount of lubricating oil that is admitted to the valve guides and stems is controlled by the clearance between the inside diameter of the valve stem seal and the outside diameter of the valve guide. A total diametral clearance between the two members of about .003 of an inch (.0015 of an inch per side) is preferred. Increasing the clearance will admit more lubricating oil, and decreasing the clearance will admit less lubricating oil. The means by which this action is accomplished, in conjunction with normal engine functions, is outlined below. The diametric clearance should be in the range from about .002 to .004 inch.

With the inlet valve seated (FIGS. 5 and 8) there is a "dead air" space 30 above the top of the valve guide that extends to the top of the valve stem seal. When the inlet valve starts to open (FIGS. 4 and 9), there is a partial vacuum which is applied to the induction system, generated by the descending piston on the induction stroke. This partial vacuum is applied with equal force momentarily to the clearance between the valve stem and the valve guide bore. During this period, oil vapors are drawn into the "dead air" space 30 above the top of the valve guide, and are thus drawn into the valve guide bores by the partial vacuum. Additionally, the oil vapors that remain in the "dead air" space after the momentary partial vacuum has been equalized, are pumped into the valve guide bore by the further opening of the valve. Thus in the early phase of the inlet valve opening period, the valve stem seal acts as a shield to prevent excessive lubricating oil from being drawn into the valve guides, and from the guides into the cylinder. And during the latter stages of inlet valve opening, the seal acts as a piston pump to pump additional lubricating oil into the valve guides. Oil vapors which are not pumped into the valve guides are pumped back into the valve chamber through the same clearance between the inside diameter of the valve stem seal and the outside diameter of the valve guide.

The lubrication of the exhaust valve guide bores and stems is more difficult than of inlet valves, largely because of the higher temperatures and pressures involved, and the direction of flow of gas away from the pistons; conventionally no seals are provided on the valve stems, so that the maximum amount of oil will be available for lubrication, even though the excess becomes burned and forms smoke. The valve seals of this invention may be successfully used on exhaust valves in the same manner as described above for the inlet valves, and with similar advantages. It is believed that the "dead air" space above the top of valve guide and the top of valve stem seal is partly filled with oil vapors, especially during the latter stages of the exhaust stroke as the exhaust gas pressure is diminishing and the exhaust valve is nearly closed. The high velocity of the exhaust gases past the almost closed exhaust valve produces a venturi effect which draws oil vapor from the space above the valve guides into the valve guide bore, and thus provides adequate lubrication at the time of exhaust valve closing.

The cup-like member 25 or 25A is easily attached and operated inside the inner valve springs without interference with the operation of the valve springs, and they may be re-used because they are not subjected to change of dimensions by wear on the valve stems since they are fixed to the valve stem.

The advantages of this invention will be understood from the above description. The valve stems of both intake and exhaust valves receive adequate lubrication but no excess oil is permitted to move through the bores of the valve stem guides into the space above the engine pistons.

I claim:

1. A valve stem seal adapted to be attached axially by its interference fit to a valve stem comprising a rigid molded fluorocarbon polymer plastic cup having an inside cylindrical surface disposed to make sliding contact with a valve stem guide during the operative movement of the valve stem.

2. A valve stem seal having means for attachment axially to a valve stem comprising a metal cup having an axial hole in its closed end and having an inside cylindrical surface disposed to make sliding contact with a valve stem guide during the operative movement of the valve stem, said means for attachment to the valve stem consisting of a grommet made of oil resisting and high temperature resistant synthetic plastic fastened to the edges of said axial hole and having an interference fit on the valve stem.

3. In an internal combustion engine having a reciprocating valve means including a valve head, a valve stem attached thereto, and a valve stem guide in which said valve stem may be reciprocated longitudinally, wherein the valve stem guide is cylindrical in the end portion disposed away from said valve head; a valve stem sealing and oil pumping means comprising a rigid cup-like member consisting of a drawn metal cup whose closed end is provided with an aperture larger than the valve stem, and a grommet made of oil-resisting and high temperature resistant synthetic plastic fastened to the edges of said aperture and having an interference fit on said valve stem whereby to maintain said member in fixed but adjustable longitudinal position on said valve stem, the inside cylindrical surface of said cup-like member being adapted to make sliding contact over the said cylindrical portion of said valve stem guide and having sufficient clearance to produce oil pumping.

4. In an internal combustion engine having a reciprocating valve means including a valve head, a valve stem attached thereto, and a valve stem guide in which said valve stem may be reciprocated longitudinally, wherein the valve stem guide is cylindrical in the end portion disposed away from said valve head; a valve stem sealing and oil pumping means comprising a rigid cup-like member having a cylindrical inside surface adapted to make sliding contact over said cylindrical portion of said valve stem guide and having sufficient clearance to produce oil pumping, the diameter of said cylindrical portion of said guide being less than the cylindrical inside surface of said cup-like member by an amount in the range from .002 to .004 inch, said member having an apertured closure and having the margins of said aperture making an interference fit on said valve stem whereby to maintain said member in fixed but adjustable longitudinal position on said valve stem.

References Cited by the Examiner
UNITED STATES PATENTS
3,110,298    11/1963    Giles _____ 123—188
FOREIGN PATENTS
256,615    8/1926    Great Britain.

MARK NEWMAN, *Primary Examiner.*

FRED E. ENGELTHALER, *Examiner.*

W. E. BURNS, *Assistant Examiner.*